United States Patent [19]

Fieldhouse

[11] 4,130,547

[45] Dec. 19, 1978

[54] CHEMICAL MODIFICATION OF POLY(BIS-ARYLOXYPHOSPHAZENE) WITH AMINES

[75] Inventor: John W. Fieldhouse, Mogadore, Ohio

[73] Assignee: The Firestone Tire & Rubber Company, Akron, Ohio

[21] Appl. No.: 844,018

[22] Filed: Oct. 20, 1977

[51] Int. Cl.² ............................................. C08G 79/04
[52] U.S. Cl. .................................... 260/823; 528/167; 528/168
[58] Field of Search .................. 260/2 P, 47 P, 2.5 R, 260/47 R

[56] References Cited

U.S. PATENT DOCUMENTS

| | | | |
|---|---|---|---|
| 3,853,794 | 12/1974 | Reynard et al. | 260/2 P |
| 3,856,712 | 12/1974 | Reynard et al. | 260/2 P |
| 3,883,451 | 5/1975 | Reynard et al. | 260/2 P |
| 3,972,841 | 8/1976 | Cheng et al. | 260/2 P |
| 4,026,838 | 5/1977 | Dieck et al. | 260/2.5 FP |
| 4,053,456 | 10/1977 | Dieck et al. | 260/47 P |
| 4,055,523 | 10/1977 | Dieck et al. | 260/2.5 R |
| 4,061,606 | 12/1977 | Dieck et al. | 260/2.5 R |

Primary Examiner—Lester L. Lee

[57] ABSTRACT

Improvement of the polyaryloxy and polyalkylaryloxyphosphazenes such as those described in U.S. Pat. No. 3,853,794 is achieved by treating such polyphosphazenes with organic amines, preferably in solution. The polyphosphazenes are chemically modified as a result of such treatment and are converted from tough fibrous materials to relatively soft readily processed products.

13 Claims, No Drawings

CHEMICAL MODIFICATION OF POLY(BIS-ARYLOXYPHOSPHAZENE) WITH AMINES

This invention is directed to improving the processing of poly(bis-aryloxyphosphazene) polymers. Depending on the manner in which they are produced such polymers may vary from elastomers, which are readily compounded and processed with equipment commonly used for the processing of rubber, to tough leathery materials which are not responsive to processing without special measures which render them economically unattractive, especially as compared to their elastomeric counterparts.

The present invention relates to chemically modifying these polyphosphazenes which are tough, leathery or fibrous materials and which are not readily workable in conventional processing equipment such as Banbury or Brabender mixers, so as to render them amenable to working on such equipment.

The desired improvement results from the incorporation of certain organic amines into a solution of the tough, leathery phosphazene polymer. The resulting product, containing a small but significant amount of said organic amine, particularly an amine with at least one alkyl and at least one aryl substituent on the nitrogen atom exhibits a greatly enhanced processability as compared with the original polyphosphazene. Amines which exhibit very low vapor pressures at temperatures below about 200° to 300° C. are particularly preferred in the practice of this invention.

The invention will be better understood from the description which follows in which preferred embodiments of the invention are set forth by way of example and are not intended to limit the invention in any way.

EXAMPLES 1-7

An aryloxyphosphazene polymer of the type described in U.S. Pat. No. 3,853,794 issued Dec. 10, 1974 modified to include a small amount of unsaturation as a cure site was prepared in which the substituents were p-ethylphenoxy and phenoxy and o-allylphenoxy in the proportions 42/54/5. The polymer which had been prepared by derivatizing thermally polymerized $(NPCl_2)_3$ after it had been recovered from solution as described in Tate, U.S. Pat. No. 3,755,537 issued Aug. 28, 1973 was stiff, fibrous and non-resilient with a Mooney Value of 113 (ML/4/212). The same polymer was dissolved in tetrahydrofuran, together with 5.0 parts of each of the following amines, as a 10 weight percent solution and maintained at 80° C. until the amine and polymer were completely dissolved in the tetrahydrofuran. All solvent was then removed by conventional techniques leaving behind an amine modified polymer which in every case was soft, elastomeric and resilient.

| Ex. | Amine (Trade Name) | Amine (Chemical Name) |
|---|---|---|
| 1. | Santoflex 77 | N,N'bis(1,4-dimethylpentyl)-p-phenylene diamine |
| 2. | Santoflex DD | 6-dodecyl-1,2-dihydro-2,2,4-trimethyl quinoline |
| 3. | Santoflex 17 | N,N'-bis(1-ethyl-3-methyl pentyl)-p-phenylene diamine |
| 4. | Santoflex 77 | N,N'-bis(1,4-dimethylpentyl)-p-phenylene diamine |
| 5. | Santoflex 217 | N,N'bis(1-methyl heptyl)-p-phenylene diamine |
| 6. | Santoflex 13 | N-phenyl-N'-(1,3-dimethylbutyl)-p-phenylene diamine |
| 7. | Eastazone 31 | N,N'-bis(1-ethyl,3-methyl pentyl)-p-phenylene diamine |

The elastomeric polymer which is produced as a result of the treatment with the amine was found to be much more readily processed on the usual rubber processing equipment (Banbury mixer, Brabender mills, and the like) than the original tough, leathery polymer, as evidenced by the greater ease with which the amine modified polymer gum stock accepted filler, extenders and other compounding ingredients in a rubber mill mixer, and by its behavior in said equipment.

In addition, the physical properties of the amine treated polymer are improved as compared with the properties of the original untreated polymer.

The following additional examples reported in Table I will serve to further illustrate the invention.

EXAMPLE 8

Four grams of a poly(bis-aryloxy)phosphonitrile polymer prepared as described in Example 1 was dissolved in 36 g tetrahydrofuran (THF) containing 0.20 g diphenylamine (5.0 parts by weight per 100 parts of polymer). The solution was heated at 80° C. for 48 hours. Subsequent evaporation of the THF left a polymer product which was a soft, resilient elastomer, in contrast to the original polymer, which was tough, fibrous and non-resilient before treatment with the amine.

EXAMPLE 9

The same procedure was used as in Example 8 using 62 g of the same polymer and 3.1 g Santoflex DD (5.0 parts by weight per 100 parts of polymer) and heating at 80° C. for 16 hours. The resulting polymer was soft, very resilient and highly elastomeric in contrast to the original polymer which was tough, fibrous and non-resilient before treatment with the amine.

EXAMPLES 10-12

In a similar manner as described in Examples 8 and 9, a polymer produced in larger quantities was modified with several commercially available amines, namely: Eastazone 31 (5.0 phr); Santoflex 13 (5.0 phr); and Santoflex 77 (5.0 phr). In all cases the original polymer which was tough, fibrous, and nonelastic was converted into soft, resilient elastomer.

EXAMPLES 13-16

In a similar manner as described in the above examples, a large sample of a poly(bis-aryloxy) phosphonitrile polymer (13) was modified with the following amines: Flectol ODP at 5.0 phr (14); Santoflex DD at 5.0 phr (15); and Santoflex DD at 2.5 phr (16). The ML/4/212 values are shown below:

| Example | Mooney ML/4/212 |
|---|---|
| 13 | 113 (no amine added) |
| 14 | 17.8 |
| 15 | 14.8 |
| 16 | 25.1 |

A solution of 70 g of the same phosphazene polymer in 630 g THF was prepared in a 28 oz. glass bottle and maintained at 80° C. for 15½ hours; this was a 10 weight percent solution.

EXAMPLES 17-19

A 50 g sample of the above solution containing 5.0 g of phosphazene polymer, was treated with 0.25 g Eastazone 31 followed by evaporation of the solvent at 55° C. at 30 mm Hg vacuum. It was then dried at 100° C. for 2 hours 5 minutes. The recovered polymer was soft, elastomeric with a high degree of resilience.

Another 50 grams of the 10 weight percent solution of the phosphazene polymer in THF was treated with 0.25 g of Santoflex 13, followed by evaporation of the solvent at 55° C., 30 mm Hg vacuum. It was then dried at 100° C. for 2 hours at 5 mm Hg. The product recovered was soft, elastomeric with a high degree of resilience.

Another 100 grams of the 10 weight percent solution described above was treated with 0.5 g of Santoflex 77 followed by evaporation of the solvent at 55° C., 30 mm Hg. It was dried at 100° C. for 2 hours at 5 mm Hg. The recovered polymer was soft, elastomeric and resilient.

Examples 8-19 may be summarized as follows:

| Ex. | Polymer (g) | Solvent | Amine (g) | Amine | (phr) Amine |
|---|---|---|---|---|---|
| 8 | 4 | THF | 0.20 | Diphenylamine | 5.0 |
| 9 | 62 | THF | 3.1 | Santoflex DD | 5.0 |
| 10 | 100 | THF | 5.0 | Eastazone 31 | 5.0 |
| 11 | 100 | THF | 5.0 | Santoflex 13 | 5.0 |
| 12 | 100 | THF | 5.0 | Santoflex 13 | 5.0 |
| 13 | 100 | THF | None | None | None |
| 14 | 100 | THF | 5.0 | Flectol ODP* | 5.0 |
| 15 | 100 | THF | 5.0 | Santoflex DD | 5.0 |
| 16 | 100 | THF | 2.5 | Santoflex DD | 2.5 |
| 17 | 5 | THF | 0.25 | Eastazone 31 | 5.0 |
| 18 | 5 | THF | 0.25 | Santoflex 13 | 5.0 |
| 19 | 10 | THF | 0.5 | Santoflex 77 | 5.0 |

*Flectol ODP is octylated diphenylamine.

Formulations were prepared by compounding 100 parts by weight of polyphosphazene with:
50 parts by weight of hydrated alumina ($Al_2O_3 \cdot 3H_2O$);
50 parts by weight of magnesium hydroxide [$Mg(OH)_2$];
10 parts by weight of Silane Base 6587; and
1 part by weight of Vulcup 40 KE.

Silane Base 6587 is a silica filled methylvinylphenyl-polysiloxane which is added as a processing aid.

Vulcup 40KE is a peroxide based curing agent based on dicumyl peroxide.

The physical properties of the resulting polymer formulations are given in Table I. In the formulations containing the amine treated polymers of Examples 8, 9, 14, 15 and 16, the amine was added to the polymer as a solution. In the formulations identified as A, B and C the amine was added on a mill, no amine addition being made in A, 2.5 parts of amine (Santoflex D) were added in B and 5.0 parts of amine were added in C per 100 parts of polymer.

As shown by the results set forth in Table I, the properties of the polyphosphazenes are improved whether the amine treatment is made by an addition in solution or an addition on a mill and it is not intended that the invention be limited to a specific manner of addition.

TABLE I

FORMULATION--100 Polymer, 50 $Al_2O_3 \cdot 3H_2O$, 50 $Mg(OH)_2$, 10 Silane Base 6587, 1 Vulcup 40 KE

| Polymer | Example 8 | | Example 9 | | Example 14 | Example 15 | | |
|---|---|---|---|---|---|---|---|---|
| Cure Time at 350° F | 10' | 20' | 10' | 20' | 20' | 5' | 10' | 20' |
| 50% Modulus, psi | — | — | 425 | 550 | — | 557 | 628 | — |
| 100% Modulus, psi | — | — | 1000 | — | — | — | — | — |
| Tensile, psi | 400 | 450 | 1000 | 950 | 850 | 1075 | 850 | 780 |
| Elongation % | 30 | 25 | 103 | 75 | 40 | 80 | 60 | 45 |
| Polymer | Example 16 | | | Control A | | Control B | | Control C |
| Cure Time at 340° F | 5' | 10' | 20' | 10' | 10' | 20' | 20' | 20' | 20' | 20' |
| 50% Modulus, psi | 935 | 1194 | 350 | — | — | — | — | — | — | — |
| 100% Modulus, psi | — | — | 1110 | — | — | — | — | — | — | — |
| Tensile, psi | 1158 | 1194 | 1110 | 460 | 400 | 210 | 560 | 350 | 500 | 770 |
| Elongation % | 60 | 50 | 100 | 10 | 30 | 20 | 30 | 25 | 40 | 40 |

In every instance the original polymer was tough and leathery and the amine treated polymer was elastomeric.

A suitable range of amine addition to the polymers is between 1 and 10 parts per 100 parts of leathery polymer with a range of beween 2.5 and 5 parts of amine per 100 parts of polymer being preferred. Addition of amounts greater than 10 parts per 100 of polymer merely increase the expense and do not appear to confer any additional benefits. Addition below 1 part per 100 are not effective for the desired improvement.

The amine treatment may be carried out in solution at temperatures between 0° C. and 150° C. or by direct addition to the polymer, e.g. on a rubber mill. Solvents which may be used when the treatment is carried out in solution include benzene, toluene, chlorobenzene and other aromatics, the choice being dependent on the polymer and the amine.

The amines illustrated in the preceding examples may be considered to belong to the following families:
(a) N,N'-disubstituted p-phenylenediamines;
(b) substituted 1,2-dihydro-2,2,4-trimethyl quinolines; and
(c) substituted diphenylamines.

A generic formula for the amines would be

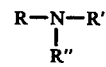

wherein R is H, alkyl, cycloalkyl or a fused cycloalkylaryl; R' is aryl of H; R" is aryl or an aryl substituted in the ortho, meta or para position with —NHR or

The preferred amine is Santoflex DD which is 6-dodecyl-1,2-dihydro-2,2,4-trimethyl quinoline.

In the preceding examples, the derivatized polyphosphazenes utilized were those described in U.S. Pat. No. 3,853,794 issued Dec. 10, 1974 but the invention is applicable to other polyphosphazenes represented by the general formula

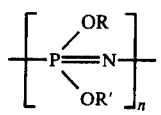

in which R and R' are each selected from the group consisting of alkyl, alkylaryl, aryl any of which may be either substituted or unsubstituted as shown in the below noted patents, and need not be the same and n is an integer between about 20 and about 50,000 or more, and in which some of the R or R' groups may contain some unsaturation to facilitate curing the products, e.g. as described in Kyker et al. U.S. Pat. No. 3,970,533.

Recent U.S. patents in which such polyphosphazenes are described include: Allcock, U.S. Pat. No. 3,370,020, issued Feb. 20, 1968; Rose, U.S. Pat. No. 3,515,688, issued June 2, 1970; Reynard et al., U.S. Pat. No. 3,700,629, issued Oct. 24, 1972; Rose et al., U.S. Pat. No. 3,702,833, issued Nov. 14, 1972; Reynard et al., U.S. Pat. No. 3,856,712, issued Dec. 24, 1974; Rose et al., U.S. Pat. No. 3,856,713, issued Dec. 24, 1974; Reynard et al., U.S. Pat. No. 3,853,794, issued Dec. 10, 1974; Reynard et al., U.S. Pat. No. 3,883,451, issued May 13, 1975; Kyker et al., U.S. Pat. No. 3,970,533, issued July 20, 1976.

It appears that when such derivatized polymers have been prepared from polydihalophosphazenes which have been recovered, as described in Tate, U.S. Pat. No. 3,755,537 issued Aug. 28, 1973, the resulting derivatized polyphosphazene is tough and leathery whereas when they are prepared from polydihalophosphazenes which have been purified by sublimation, the derivatized polyphosphazenes are elastomeric.

While not wishing to be bound by any specific theory it appears that the difference may be due to the presence or absence of low molecular weight oligomers. The present invention is particularly applicable to derivatized polyphosphazenes from which the lower molecular weight materials are absent.

I claim:

1. A process for improving the physical properties of phosphazene polymers represented by the general formula

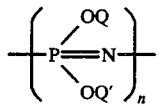

in which Q and Q' are each selected from the group consisting of alkyl, alkylaryl and aryl and may be substituted or not, and some of which contain some unsaturation, and n is an integer between about 20 and about 50,000, which polymers are initially tough, fibrous materials which comprises;

adding to the phosphazene polymer between 1 and 10 parts by weight of an amine per 100 parts by weight of phosphazene polymer, said amine being selected from the group consisting of quinolines and amines represented by the general formula

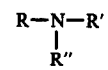

wherein R is selected from the group consisting of H, alkyl, and cycloalkyl; R' is selected from the group consisting of aryl and H; R" is selected from the group consisting of aryl and aryl substituted in the ortho, meta or para position with —NHR or

and recovering the amine modified phosphazene polymer as a relatively soft, readily processed elastomer.

2. The process of claim 1 in which the amine is added to the polymer while the polymer is in solution and the amine modified polymer is recovered by removing the solvent from the solution.

3. The process of claim 1 in which the amine is added to the polymer on a mill.

4. The process of claim 1 wherein the polyphosphazene is a poly(bisaryloxyphosphazene).

5. The process of claim 1 wherein the amount of amine is between 2.5 and 5 parts by weight per 100 parts of polyphosphazene.

6. The process of claim 1 wherein the amine is a substituted 1,2-dihydro-2,2,4-trimethyl quinolines.

7. The process of claim 1 wherein the amine is a N,N'-disubstituted p-phenylenediamines.

8. The process of claim 1 wherein the amine is a substituted diphenylamines.

9. The process of claim 1 wherein the amine is 6-dodecyl-1,2-dihydro-2,2,4-trimethyl quinoline.

10. The process of claim 1 wherein the amine has a relatively low vapor pressure at 300° C.

11. An amine modified polyphosphazene produced by the process of claim 1.

12. An amine modified polyphosphazene produced by the process of claim 2.

13. An amine modified polyphosphazene produced by the process of claim 3.

* * * * *

UNITED STATES PATENT OFFICE
CERTIFICATE OF CORRECTION

Patent No. 4,130,547    Dated December 19, 1978

Inventor(s) John W. Fieldhouse

It is certified that error appears in the above-identified patent and that said Letters Patent are hereby corrected as shown below:

Column 3, line 46, in the table:
 Ex. 12, under the heading "Amine"
 "Santoflex 13" should be -- Santoflex 77 --

Signed and Sealed this

Sixteenth Day of October 1979

[SEAL]

Attest:

RUTH C. MASON
Attesting Officer

LUTRELLE F. PARKER
Acting Commissioner of Patents and Trademarks